(12) United States Patent
Smith

(10) Patent No.: US 10,591,101 B2
(45) Date of Patent: Mar. 17, 2020

(54) PULSATION DAMPENING SYSTEM FOR HIGH-PRESSURE FLUID LINES

(71) Applicant: Ronald E. Smith, Palmer, AK (US)

(72) Inventor: Ronald E. Smith, Palmer, AK (US)

(*) Notice: Subject to any disclaimer, the term of this patent is extended or adjusted under 35 U.S.C. 154(b) by 135 days.

(21) Appl. No.: 15/412,052

(22) Filed: Jan. 22, 2017

(65) Prior Publication Data

US 2017/0211741 A1 Jul. 27, 2017

Related U.S. Application Data

(60) Provisional application No. 62/447,792, filed on Jan. 18, 2017, provisional application No. 62/298,459, filed on Feb. 23, 2016, provisional application No. 62/286,367, filed on Jan. 23, 2016.

(51) Int. Cl.
*F16L 55/053* (2006.01)
*F15B 1/04* (2006.01)

(52) U.S. Cl.
CPC .............. *F16L 55/053* (2013.01); *F15B 1/04* (2013.01)

(58) Field of Classification Search
CPC ................................ F16L 55/053; F15B 1/04
USPC ...................................................... 138/30, 31
See application file for complete search history.

(56) References Cited

U.S. PATENT DOCUMENTS

| | | | | |
|---|---|---|---|---|
| 2,497,491 A * | 2/1950 | Douglas | ............... | F15B 1/08 138/30 |
| 3,560,053 A * | 2/1971 | Ortloff | ............... | E21B 43/267 406/109 |
| 5,219,000 A * | 6/1993 | Chalasani | ............... | F15B 1/22 138/26 |
| 5,311,910 A * | 5/1994 | Hasegawa | ............... | F15B 1/24 138/30 |
| 6,123,525 A * | 9/2000 | Burns | ............... | F04B 11/0016 303/87 |
| 7,322,377 B2 * | 1/2008 | Baltes | ............... | F15B 1/24 138/26 |
| 7,395,838 B2 * | 7/2008 | Weber | ............... | F15B 1/24 138/30 |
| 8,267,123 B2 * | 9/2012 | LeBlanc | ............... | F15B 1/24 138/30 |

* cited by examiner

*Primary Examiner* — Mary E McManmon
*Assistant Examiner* — David R Deal
(74) *Attorney, Agent, or Firm* — Sherman D. Pernia

(57) ABSTRACT

Disclosed is an in-flow pulsation dampening system for high-pressure (e.g., 10K psi and higher) fluid lines. At high fluid flow pressures, the dampening system is a dual stage dampening system, responsive to low (e.g., when first charging the fluid line) and to very high-pressure pulsations. An external containment shell handles the full fluid flow pressures. One or more internal shells contain and handle the internal gas dampening system. The in-flow relationship of the gas dampening component assures that pressure differences between the internal gas handling system and the high-pressure fluid flow is always relatively small. This enables the gas handling components to be constructed of less robust material than the external shell (even though the gas system's internal pressure can equal that of the fluid flow), and be less susceptible to pressure failure.

7 Claims, 15 Drawing Sheets

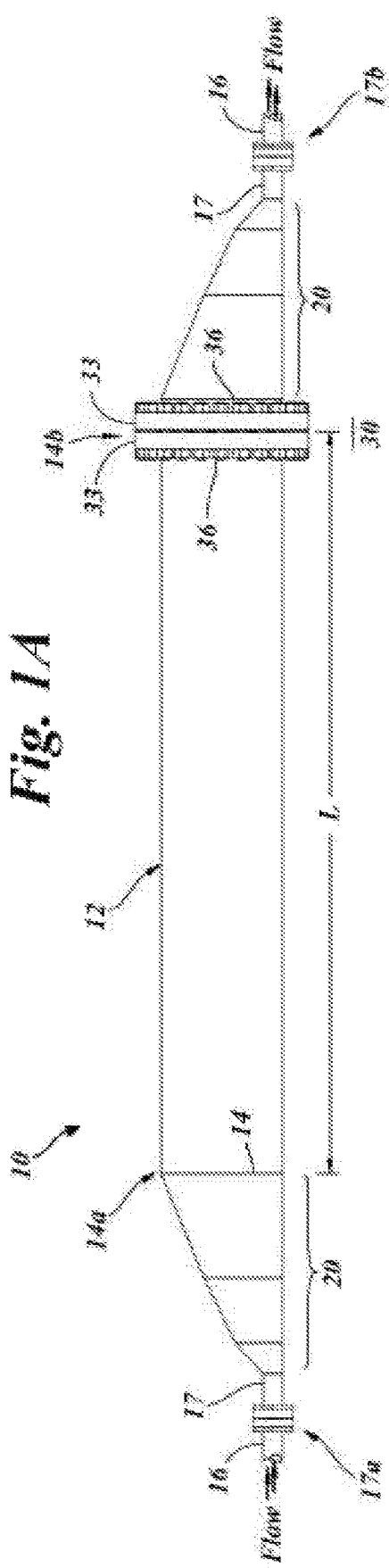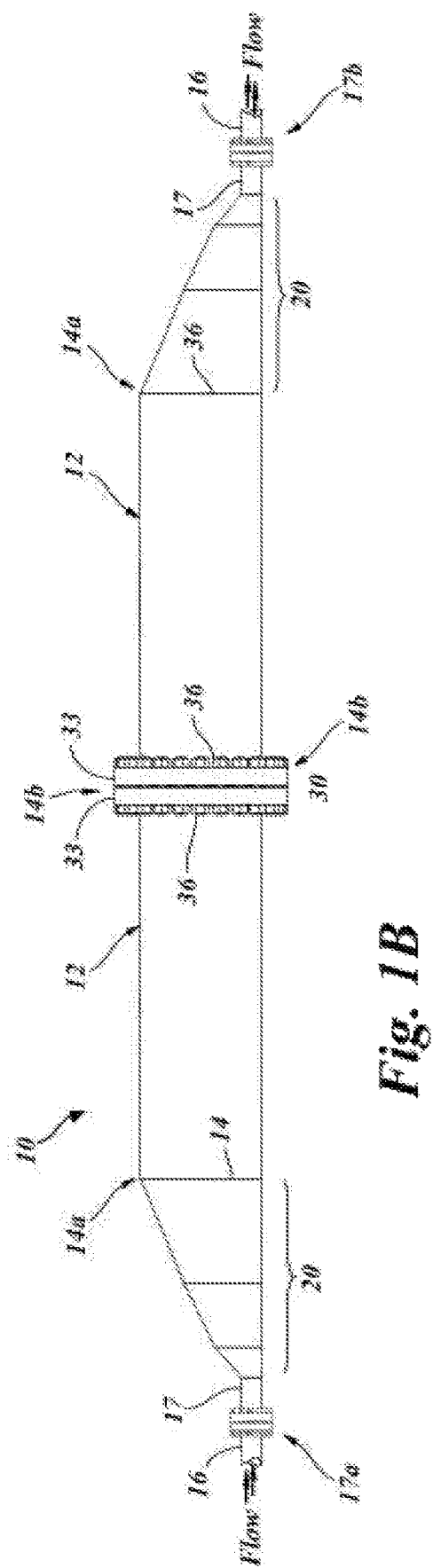

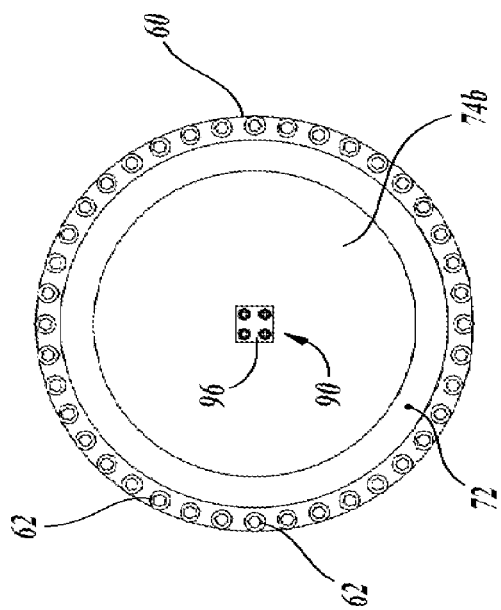
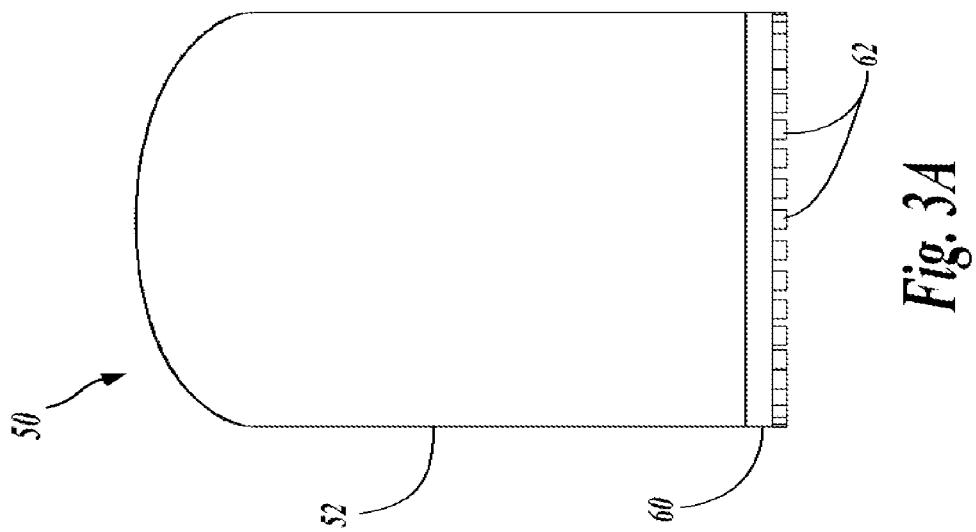

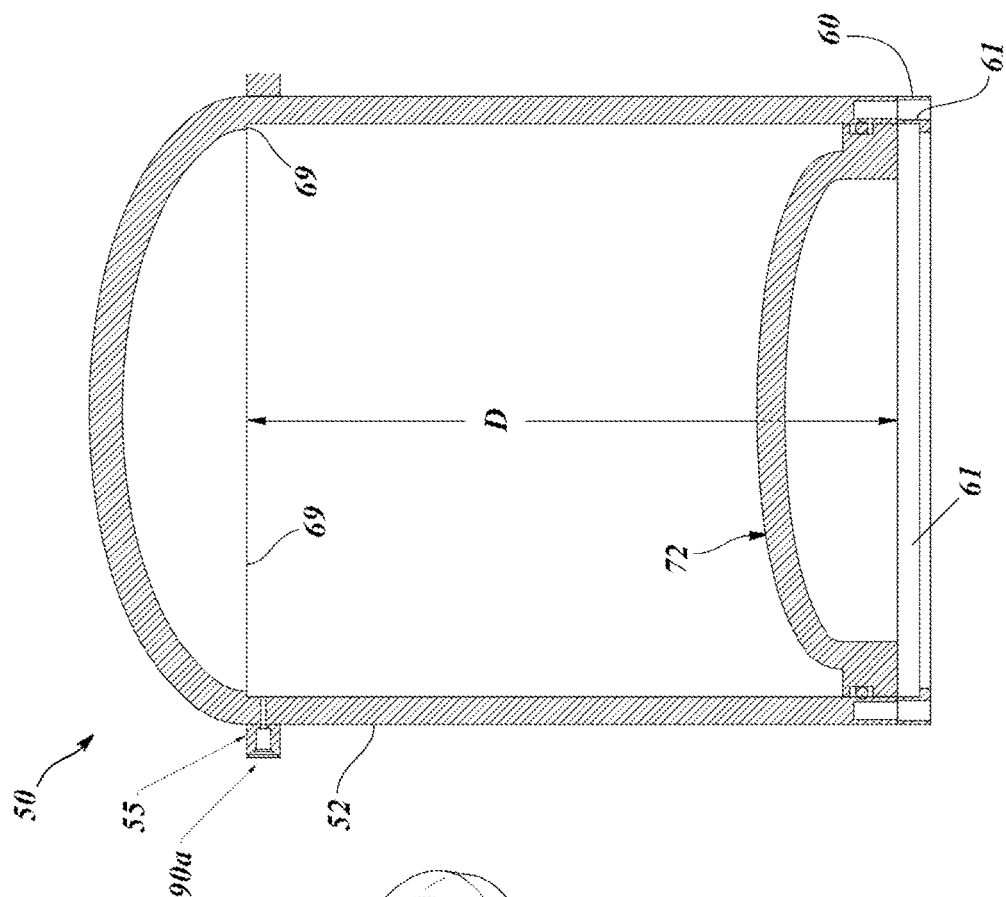
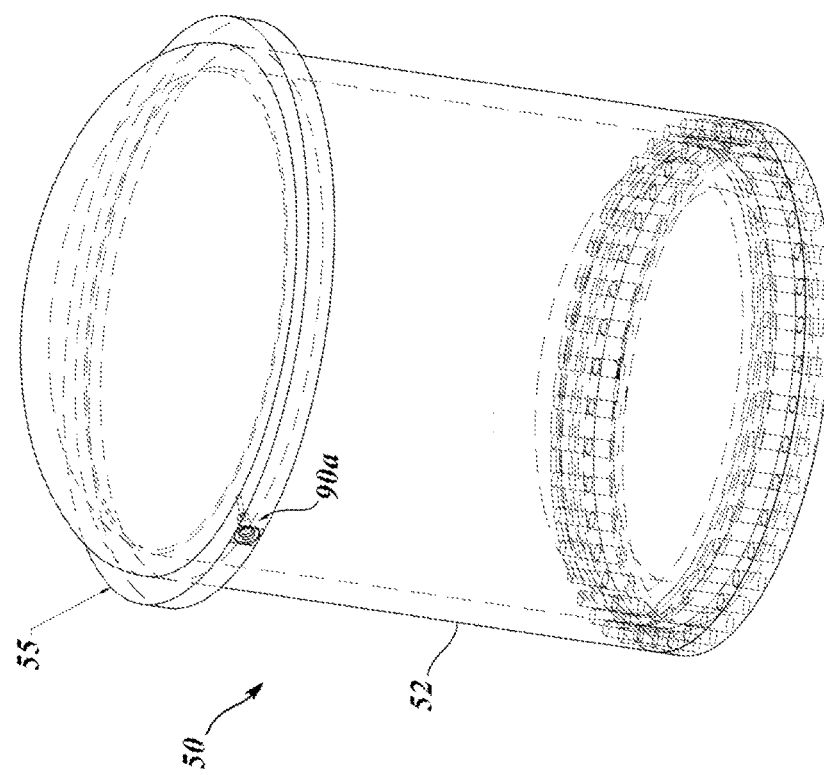

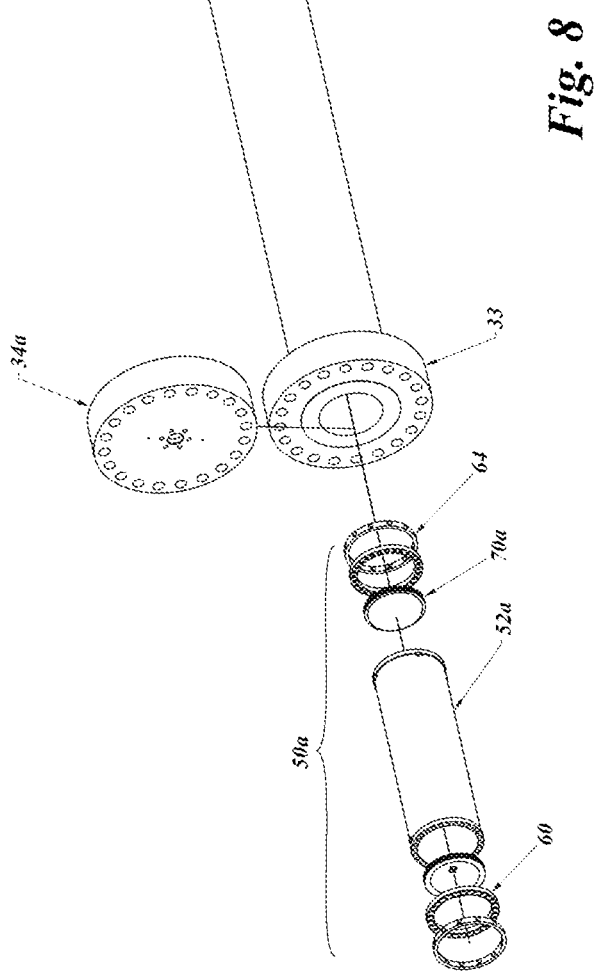
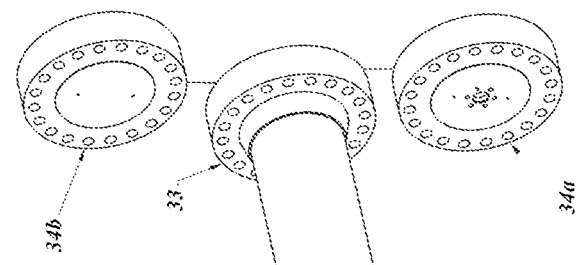
Fig. 8

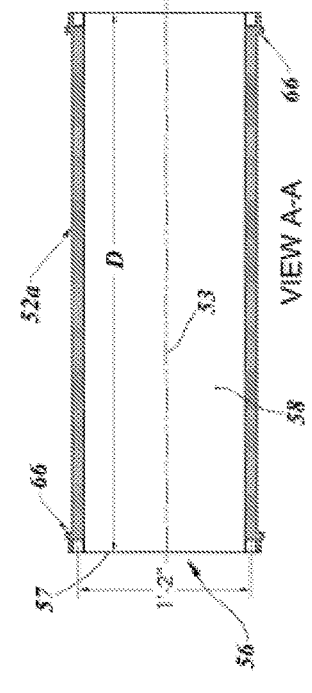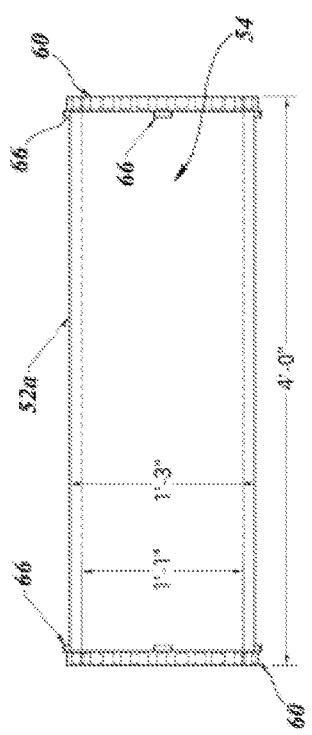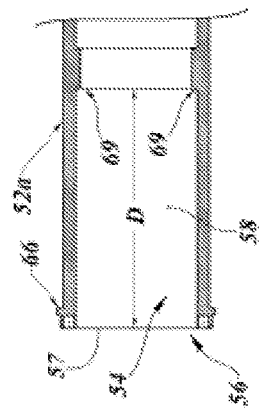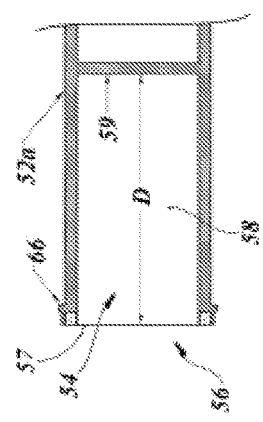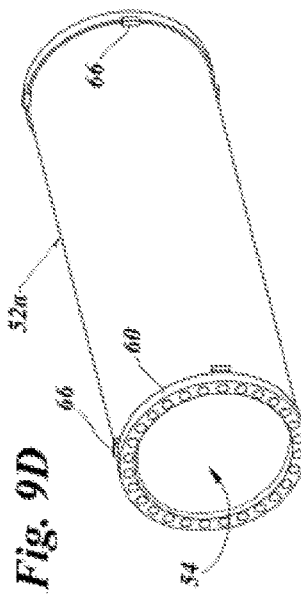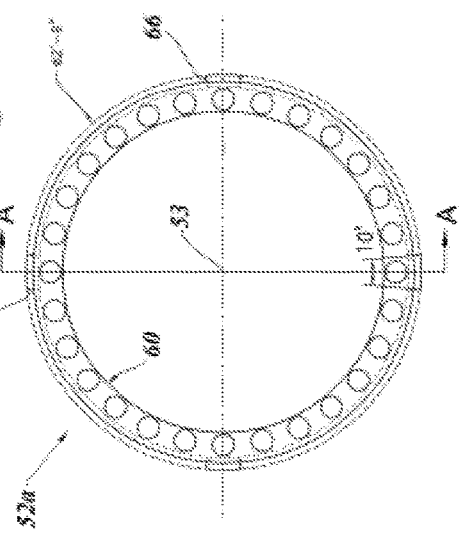

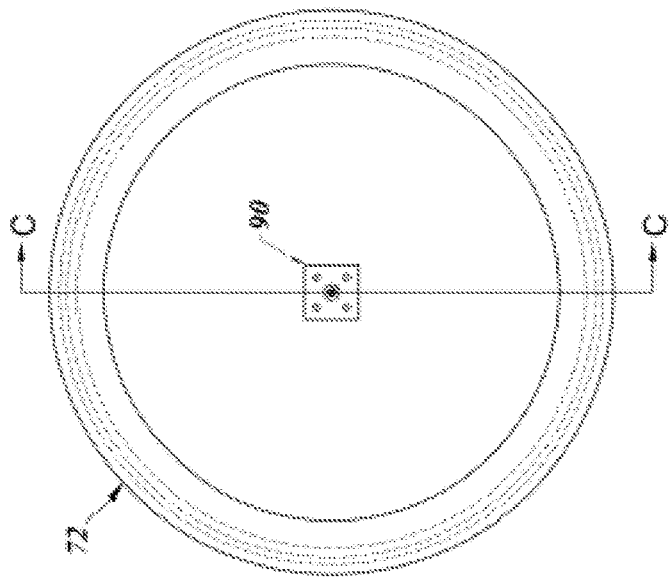
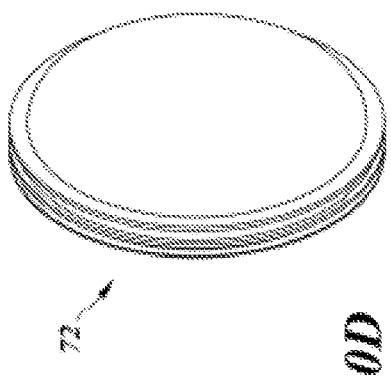
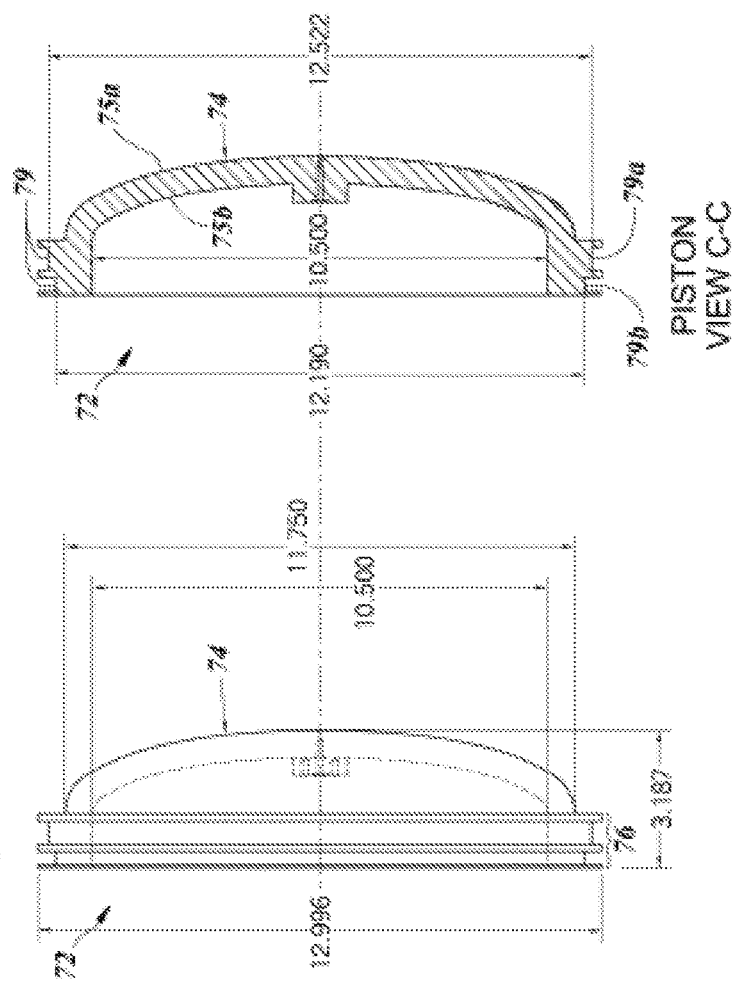
Fig. 10A  Fig. 10B  Fig. 10C  Fig. 10D

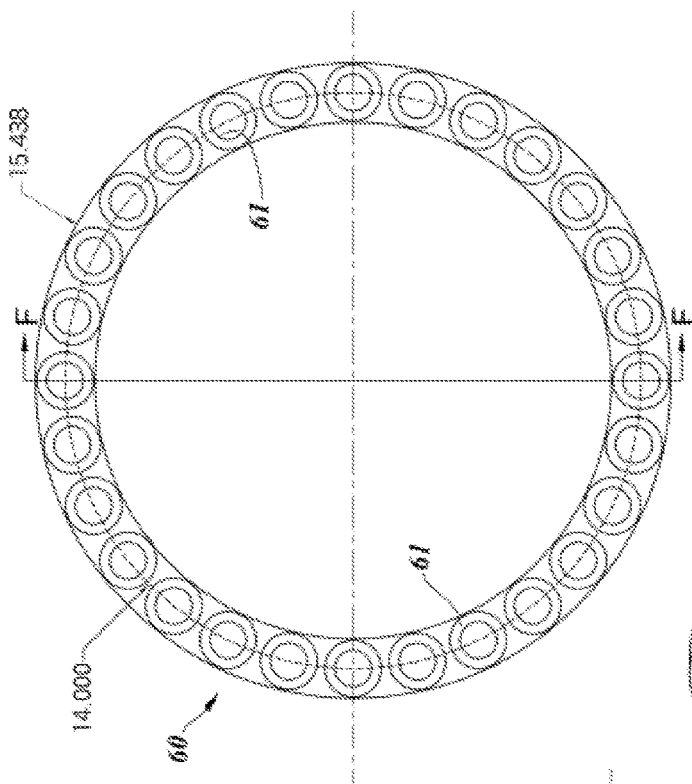
Fig. 11A
Fig. 11B
Fig. 11C
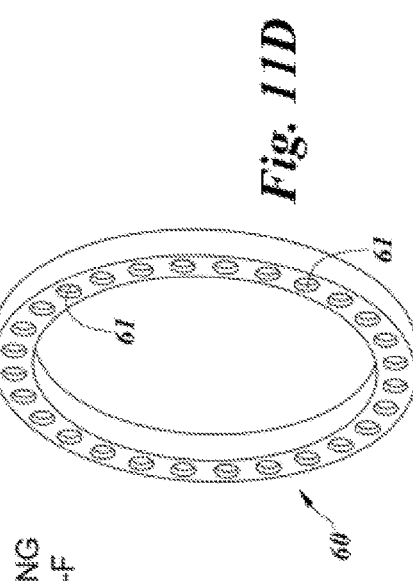
Fig. 11D

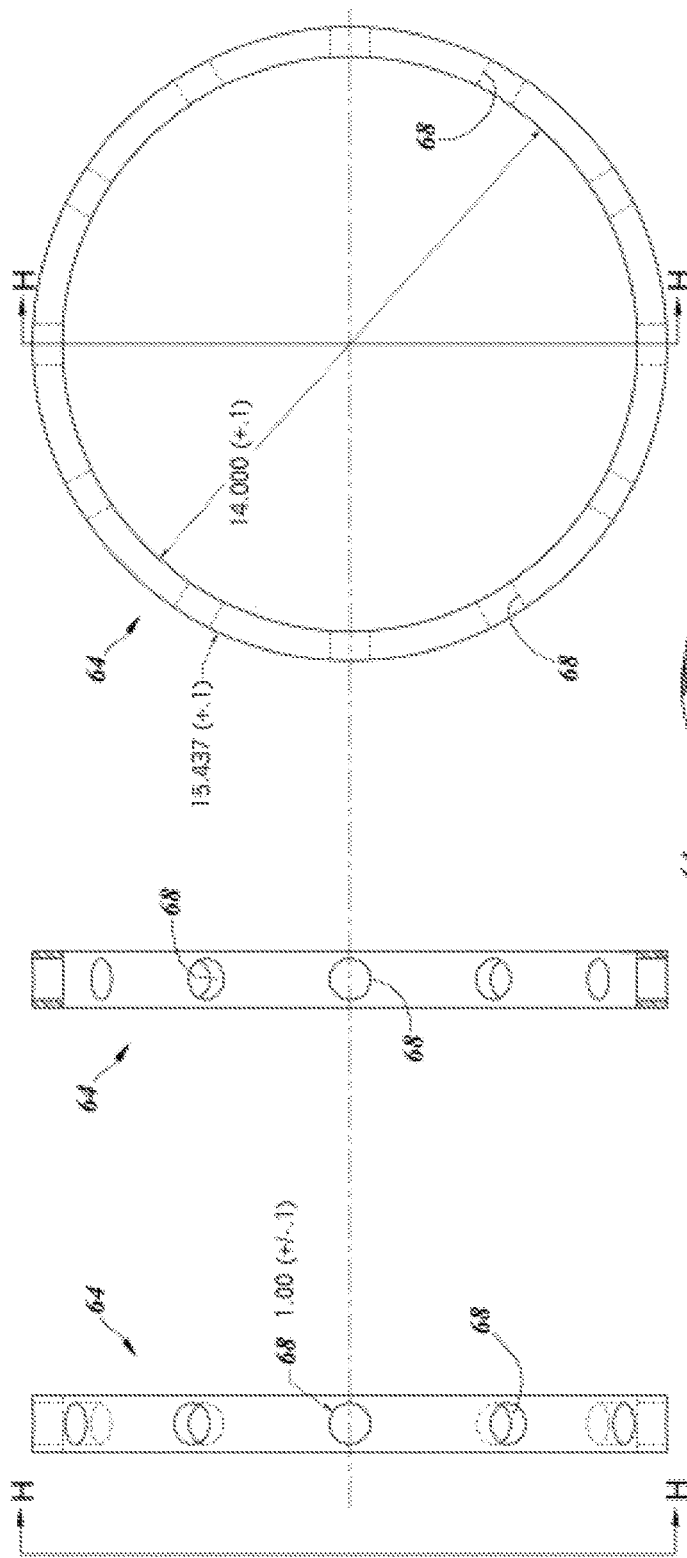

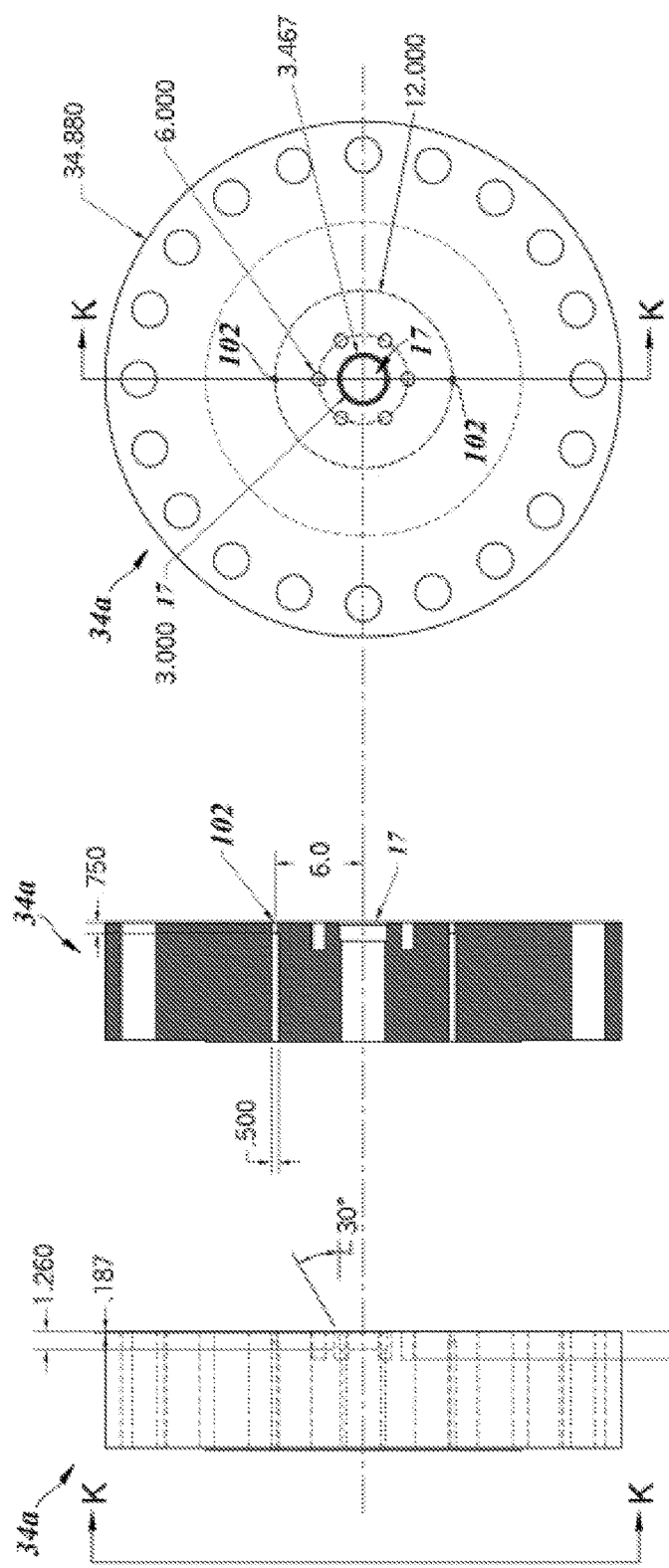
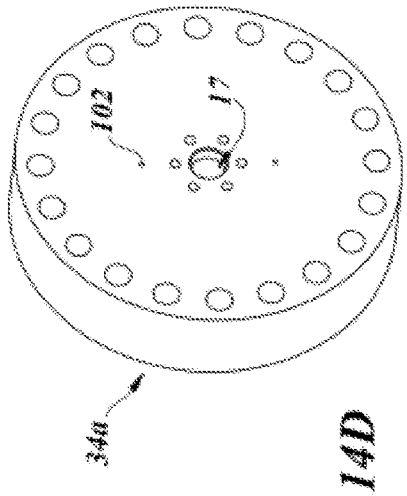
Fig. 14A  Fig. 14B  Fig. 14C  Fig. 14D

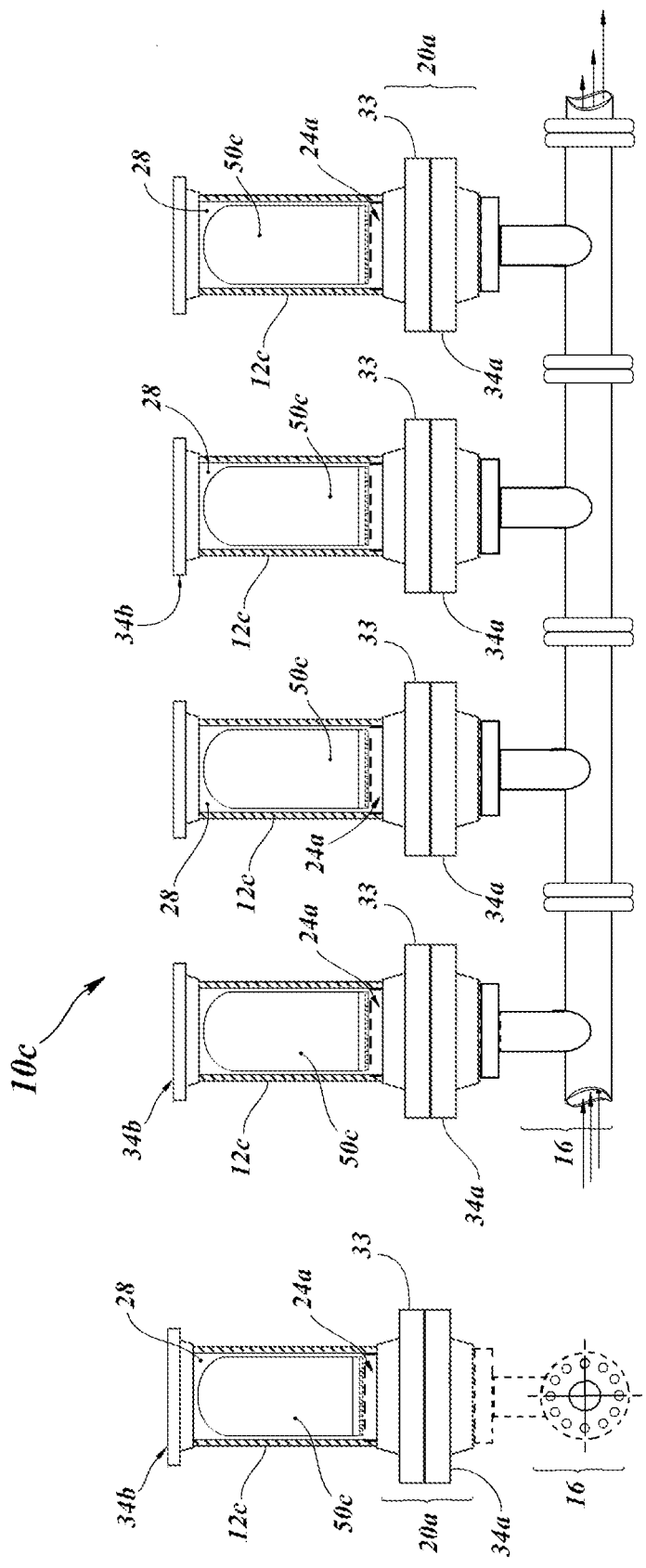

PULSATION DAMPENING SYSTEM FOR HIGH-PRESSURE FLUID LINES

CONTINUITY DATA

The present application claims the benefit of prior filed U.S. Provisional Patent Applications: Ser. No. 62/447,792 filed 18 Jan. 2017, Ser. No. 62/298,459 filed 23 Feb. 2016, and Ser. No. 62/286,367 filed 23 Jan. 2016; to which prior applications the present application is a regular US national application, and which prior applications are incorporated herein by reference.

FIELD OF THE INVENTION

The present invention is in the field of pipes and tubular conduits, including internal structures and end structures of the tubular member, and having fluid pressure compensators, e.g., accumulators or cushioning devices (Class 138). Specifically, the present invention relate to devices with pressure compensators attachable to a pipeline for dampening pulsations in pressure caused by a quick-shutoff of flow or by the non-uniform action of a pump system to maintain a more nearly constant pressure of the fluid (subclass 26). More specifically, the present invention relates to such devices having variable chambers (subclass 30), in which the chamber is of variable capacity by reason of a slideable piston or plunger (subclass 31).

BACKGROUND OF THE INVENTION

An example use case for the present invention is in the field of high-pressure hydraulic fracturing (aka: "fracing"), as used in the oil production industry. Fracing includes the use of high-pressure, positive displacement, pulsing pumps to deliver suspended sand fracing fluids to subsurface areas containing oil deposits. The fracing process cracks the formation where oil resides and places sand in the fractures for improved oil flow and volume to the wellbore.

Although utilizing the fracing process increases the cost of production for a well using it, the process can substantially increase the efficiency of the well's production. In times of high oil prices, the increase of production efficiency exceeds the cost of the fracing process. Demand for fracing, along with horizontal drilling spurred a boom in US oil and natural gas production. However, in times of low oil prices, the increase in production efficiency does not offset the cost of the fracing process for the well, and low producing wells are shut-in, rather than initiating a fracing operation. Even the largest hydraulic fracturing operations in the US have been forced to dramatically cut costs in response to reduced demand for services. With oil companies cutting and expecting to continue to cut more than 100 billion dollars in spending globally, fracing expenditures are expected to concomitantly fall as much as 35%. It has been reported that about half of the hydraulic fracturing companies operating in the US would be closed or sold by year-end 2015, because of falling oil prices and reduced oil company expenditure.

With a continuing poor outlook for a significant increase in oil prices in near and mid-term future, solutions for reducing production expenses, including fracing costs, are expected to be a continued critical focus. One critically high cost common in the fracing industry is related to equipment failures, caused by the high-pressure, pulsating flow into the fracing piping. The high-pressure, pulsating flow results from the massive positive displacement pumps used to pump the fracing fluids into the fracing piping. The pressure pulses slam the couplings, joints and fittings of the piping with thousands of pounds of force three hundred (300) times per minute causing failure of these fittings. Replacement of high-pressure fracing equipment is very expensive. Failed fracing fixtures and pipe also results in costly downtime required to resource and replace failed components before the production process can continue. Pumps, piping, fittings, and valves are all adversely affected by the very high-pressure pulses from the massive positive displacement fracing pump systems. The industry has long been in search of meaningful solutions to the fracing iron failure problem. It would be seriously beneficial to the oil production industry, and hydraulic fracturing services specifically, if a means for reducing fracing costs could finally be provided with a solution.

However, there are serious barriers to safe and successful implementation pulsation dampening on high-pressure pulsatile flow lines. One major barrier is to the use of "gas-cushioning" in pulsation dampeners. This is because in high-pressure applications (e.g., pressures on the order of 20,000 psig), the very highly compressed gas can present a very real explosion threat and potential injury to nearby persons and equipment. Another barrier that has long prevented the application of "gas-cushioning" in pulsation dampeners is the limitations of gas-seals in the dampener apparatus to withstand and be proof against the high $\Delta_p$ (pressure differentials) typical of high-pressure pulsatile flow systems. Also, in "gas-cushioning" type pulsation dampeners with moving interfaces (e.g., a sliding piston) the pressure differentials across barriers (e.g., walls) separating liquid and gaseous spaces can be distorted or caused to balloon under the pressure differences. This is a serious problem for maintaining liquid/gas seal integrity at a dampener's moving/sliding interfaces.

| | Reference Numerals |
|---|---|
| D | Depth of the interior wall |
| L | Length of Dampener housing |
| 10 | HP flow pulsation dampener |
| 12 | Dampener housing |
| 14 | Dampener housing end |
| 14a | Dampener housing 1st end |
| 14b | Dampener housing 2nd end |
| 15 | Dampener housing axis |
| 16 | High-pressure fluid flow line |
| 17 | Fluid I/O port |
| 17a | Fluid inlet port |
| 17b | Fluid outlet port |
| 20 | Housing-to-flow line adapter |
| 22 | Fluid flow thru-path |
| 24 | Non-flow fluid chamber |
| 26 | Liquid communication means |
| 28 | Dampener housing fluid space |
| 30 | Union |
| 33 | Union flange member |
| 34 | Union flange member |
| (a&b) | |
| 36 | Flange fasteners |
| 50 | Damper canister |
| 52 | Canister housing |
| 53 | Canister housing axis |
| 54 | Canister interior space |
| 55 | Canister flange |
| 56 | Canister opening |
| 57 | Canister rim |
| 58 | Canister interior wall |
| 59 | Canister interior bulkhead |
| 60 | Piston stop ring |
| 61 | Fastener aperture |
| 62 | Stop ring fasteners |
| 64 | Through-flow spacer ring |

-continued

Reference Numerals

| | |
|---|---|
| 66 | Radius stand-off |
| 68 | Ring fluid port |
| 69 | Canister piston stop shoulder |
| 70 | Damper piston assembly |
| 72 | Damper piston |
| 74 | Damper piston head |
| 75a | Piston gas pressure surface |
| 75b | Piston fluid pressure surface |
| 76 | Damper piston skirt |
| 79 | Piston ring channel |
| 82 | Wiper ring |
| 90 | Gas port fitting |
| 92 | Gas port |
| 94 | Gas valve |
| 96 | Gas port cover |
| 102 | Canister gas port |

SUMMARY OF THE INVENTION

Pulsations from high-pressure, massive positive displacement can only effectively be controlled through the use of gas to provide dampening or "cushioning". The use of high-pressure gas presents safety and design challenges. Gases under extreme high-pressure are, by their nature, explosive. Control of gases at pressures in excess of three thousand (3,000) psig requires extremely heavy wall containers and massive flanges, when contained using conventional material. This invention manages both the safety and the heavy wall concerns to present a safe and manageable solution to the requirement for pulsation reduction in high-pressure systems.

Prior art pulsation dampeners typically have a gas bladder design. These prior art dampeners are generally low volume gas due to their limited pressure of 3,000 psig or below. Higher pressures require higher volumes of compressed gas due to the significantly reduced space as the gas is compressed for pulsation control service. Obviously, as the pressure increases with the resultant increase in high-pressure gas volume, safety concerns dominate. This concern eliminates the use of single volume bladders. Until this invention, high-pressure dampeners were not available, as companies would not allow such equipment in vibration service. Additionally, the size and weight of these high volume dampeners has limited their use.

As stated, the typical single gas volume (bladder) has been the basis for pulsation control for prior art at much lower pressures. This invention embodies a new approach to the large gas volume by segmenting the large gas volume into discrete, single volumes of gas enclosed in cylinders. These cylinders are equipped with pistons and the pistons move vertically to compress the gas above and within the cylinder. The gas-containing, piston-driven cylinders are then placed internally along the pulsation dampener housing. The pulsation dampener housing is designed to withstand full hydraulic pressure of the process. The cylinders are designed, however, for only a minimum of 4,000 psig.

The pulsation dampener housing is designed with eccentric reducers gradually increasing housing diameter from the flow piping to a large diameter pulsation dampener housing where the gas cylinders reside. The pulsation dampener housing is flanged for easy removal, inspection and replacement of the pressure cylinders from the pulsation dampener housing. The gas cylinders are placed in the pulsation dampener housing in such a manner that the process fluid passes directly below every canister as the flow enters, flows through and then exits the dampener.

At the initiation of the process, the spaces around the sealed gas canisters become fluid-packed. After the dampener becomes fluid-packed, flow continues below the gas cylinders as designed. At that point, pressure pulses from the massive positive displacement pumps are transferred to all portions of the pulsation dampener housing and all external surfaces of the gas cylinders. Since the gas cylinders are preloaded with gas to 4,000 psig, as the external pressure increases on the gas cylinders, the differential pressure across the gas cylinder housing decreases, further reducing any threats of cylinder damage and gas release. As the pressure equalizes at 4000 psig and then continues to increase, the gas cylinder piston lifts due to the pressure differential across the piston. However, the pressure differential across the cylinder housing is now zero with full containment of the gas within the cylinder. The pulsation dampener housing is exposed only to the hydraulic pressure, while the gas is secondarily contained in stress-free gas cylinders. Further increases in pressure result in increased hydraulic pressure to the pulsation dampener housing only. These further pressure increases in the system and on the gas cylinders only serve to lift the gas cylinder pistons to maintain an internal pressure equal to the external pressure to the cylinders.

As the high-pressure positive displacement pumps reach the required system pressure, high-pressure, equipment-damaging pulses initiate. As each pressure pulse from the reciprocating pistons of the positive displacement pumps enter the pulsation dampener, the increase in dampener housing pressure form the pulse causes the gas cylinder pistons to react and rise, dampening the pulse and reducing it to manageable magnitudes in the dampener. The magnitude of the pulse is dampened and the fluid flow through the dampener continues under the pistons as designed. The pulses are effectively dampened by the action of the piston movement to absorb the pulse in the gas volumes of the gas cylinders. During operation, the maximum pressure across the gas cylinders is around 250 psig, while the cylinders remove up to 3,000 psig pressure magnitude of the pulses during operation. The very low pressure of 250 psig offers little threat to the structural integrity of the cylinders designed to withstand 4,000 psig. During the high-pressure pumping process, the dampener housing is only exposed to a much safer lower hydraulic pressure.

After the high-pressure process completes, the hydraulic pressure is relieved from the dampener housing. At that point, the gas cylinder pistons return to their original position at the start of the high-pressure process. Before, during and after, the gas cylinders are housed in a two (2) inch thick housing further adding protection from exposure to high-pressure gas release.

Suspended solids are difficult to manage due to plugging and fouling. This invention handles suspended solids by incorporating a design that promotes high velocity under the gas cylinders such that suspended solids simply pass through the dampener with little effect on the dampener operation. Special wiper seals protect the piston seals during operation. The small amounts of solids infiltrating the dampener housing during the process initiation and the filling of the dampener with fluid simply settle to the lower flow stream. Since the upper portion sees little or no flow, solids are not carried to the upper section of the dampener. The flow-through design provides excellent solids management during the dampening process.

The design includes high yield strength, hardened stainless steel using patented welding processes to reduce the required wall thickness for the pulsation dampener housing. Coupled with the flow-through design, the hardened stainless steel provides both excellent erosion (suspended solids) and corrosion resistance for improved and extended equipment life for the dampener and gas cylinders.

The gas cylinders are filled through a single aperture in the piston, which also houses a one-way check valve allowing the gas to flow into the gas cylinder but restricting flow from the gas cylinder. The check valve is not a perfect seal, such that a gas inlet seal system is employed to assure no decrease in pressure prior to deployment. The check valve leakage also provides a method for depressurizing the cylinder. Depressurizing the gas cylinder is accomplished by removing the gas inlet seal, and allowing the to leak down through the check valve.

This invention is designed to safely utilize high-pressure gas to provide a "cushion" to the very high-pressure pulsation generated by high-pressure, pulse-generating pressure source such as positive displacement pumps.

BRIEF DESCRIPTION OF THE DRAWINGS

FIG. 1A is a side elevation schematic view of a preferred embodiment of the present high-pressure flow pulsation dampener.

FIG. 1B is a schematic perspective view of a series of high-pressure flow pulsation dampeners of the present invention.

FIGS. 3A and 3B are: (A) a side elevation schematic view and (B) a bottom plan view of a damper canister of the present high-pressure flow pulsation dampener.

FIGS. 6A & 6B are: (A) a partial phantom perspective view of a damper canister, and (B) a cross-sectional view of a damper canister showing an alternative disposition of the gas port fitting.

FIG. 8 is an exploded perspective view of the HP flow pulsation dampener apparatus of FIG. 7 showing a tandem damper canister in exploded view.

FIGS. 9A-9D are views of the canister housing of the tandem damper canister for practice in the present apparatus.

FIGS. 10A-10D are various views of a damper piston for use in the present apparatus.

FIGS. 11A-11D are various view of a stop ring for practice in the present apparatus.

FIGS. 12A-12D are various view of a through-flow spacer ring for practice in the present apparatus.

FIGS. 14A-14D are various view of an inlet port type union flange for practice in the present apparatus.

FIGS. 16A & 16B are partial cross-sectional (A) end view and (B) side elevation view of single canister dampener housings disposed in a series in a HP fluid flow line to accomplish the present HP flow pulsation dampener apparatus.

DESCRIPTION OF THE INVENTION

Figure 2A:
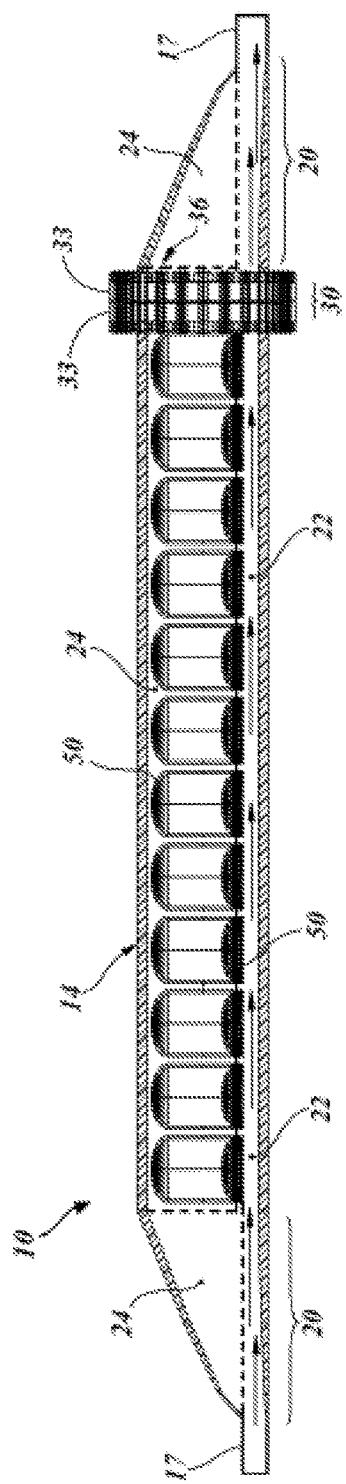
FIG. 2A is a side elevation cross-sectional schematic view of the high-pressure flow pulsation dampener of FIG. 1A.

Referring now to the drawings, the details of preferred embodiments of the present invention are graphically and schematically illustrated. Like elements in the drawings are represented by like numbers, and any similar elements are represented by like numbers with a different lower case letter suffix.

The present pulsation dampener apparatus 10 is disclosed for use in a Hydraulic Fracturing ("frac" or "fracing") process. In use in a fracing process, the pulsation dampener apparatus 10 is installed inline with the flow of the fracing fluid, and acts to dampen pressure pulses in the high-pressure fluid flow in the fracing fluid line 16. However, it is to be noted that although the embodiments set forth herein use the fracing process as an example of a pumping system utilizing high-pressure, pulsatile fluid flow, the present apparatus can be practiced with substantially any such high-pressure, pulsatile fluid flow system to dampen high-pressure pulsations . . . especially in such system utilizing fluid suspensions and having abrasive properties. It is important to note that the exemplified fracing fluids process operates at flow rates and line pressures using highly abrasive liquid suspensions that can be corrosive as well. Line pressures on the order of 12,000 psi and flow rates of over 30 mph are not unusual, all of which is intended in the present invention. In major part, the pulsation dampener apparatus 10 includes: a dampener housing 12; housing-to-flow line adapters 20; a series of damper canisters 50 internally disposed inside the dampener housing 12; and union interfaces 30 for joining a dampener housing end 14 to a housing-to-flow line adapter 20 or to the dampener housing end 14 of another dampener housing 12.

Figure 2B:
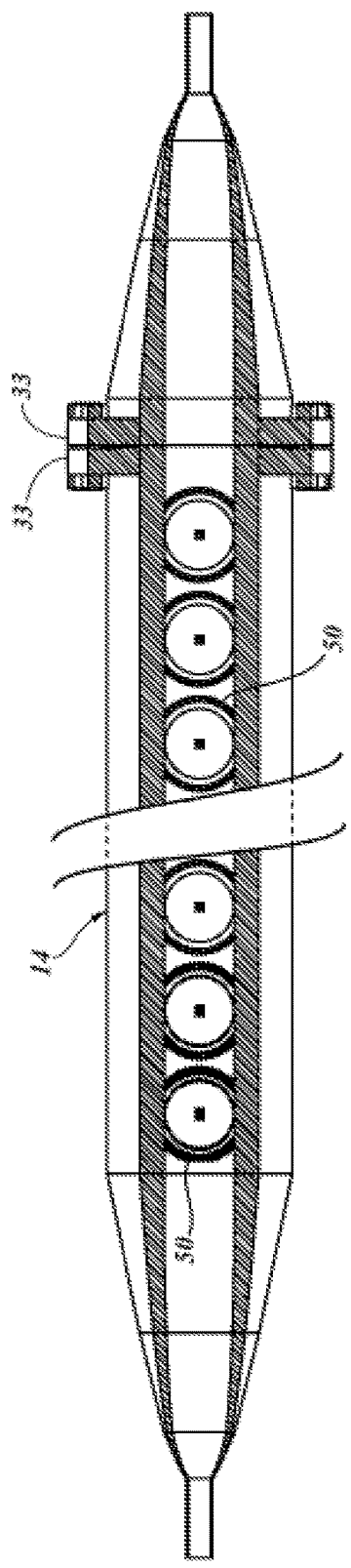
FIG. 2B is a bottom plan partial cut-away view of the high-pressure flow pulsation dampener of FIG. 1A.
Figure 2C:
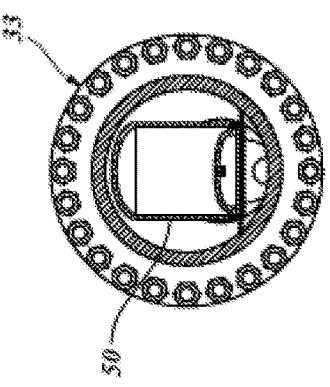
FIG. 2C is an end-on cross-sectional schematic view of the high-pressure flow pulsation dampener of FIG. 1A.

In the embodiments illustrated in FIG. 1A and FIG. 2, the dampener housing 12 of the pulsation dampener apparatus 10 is an elongated pipe having two ends 14, with first-end 14a shown as being directly connected (by welding) to a housing-to-flow line adapter 20, and a second-end 14b shown as being directly connected (by welding) to a union interface 30. In the preferred embodiment illustrated, the high-pressure components, such as the dampener housing 12, are anticipated as being made of martensitic steel (e.g., SS-420). However, high-pressure metal/steel component fabrications currently available in the field may also be used for practicing the present invention FIGS. 2A-2C show internal structure of a dampener housing 12, which includes a fluid flow thru-path 22 and a non-flow fluid chamber(s) 24, both of which are disposed along the length L of the dampener housing 12. Inside the pulsation dampener apparatus 10, and specifically inside the dampener housing 12, the fluid flow thru-path 22 and the non-flow fluid chamber(s) 24 are in liquid communication with each other. The liquid communication means 26 is adapted and disposed so that the flow rate of the fracing fluid in the fracing fluid line 16 is not substantially impacted. This is accomplished by having as close to the minimal actual fluid transfer as possible between the fluid flow thru-path 22 and the non-flow fluid chamber(s) 24. The minimal actual fluid transfer is that amount necessary to enable any gas trapped in the dampener housing 12 to be dissolved and eventually carried away. This setup also is adapted to allow the fluid pressure of the fluid flow thru-path 22 to be fully communicated the fluid in the non-flow fluid chamber(s) 24. This is an important feature of the present invention, as it directly impacts a safety benefit of the present invention, as will be explained below. The liquid communication means 26 in the embodiments illustrated is simply a plurality of through-holes in the structure or wall separating portions of the fluid flow thru-path 22 and the non-flow fluid chamber(s) 24.

A housing-to-flow line adapter 20 is used to adaptively connect one or both ends 14 of the dampener housing 12 to a high-pressure fluid flow line 16 at the inlet port (pump side) 17a of the high-pressure fluid flow line 16 or the outlet port (down-hole side) 17b. As with the dampener housing 12, the housing-to-flow line adapter 20 is also designed to so that the flow rate of the fluid in the high-pressure fluid line 16 is not substantially impacted.

The series of damper canisters 50 internally disposed inside the dampener housing 12 are the heart of the present high-pressure pulsation dampener apparatus 10. The series of damper canisters 50 is internally disposed in the non-flow fluid chamber 24 of the dampener housing 12. Each damper canister 50 has its upper portion immersed in the fluid (and fluid pressure) of the non-flow fluid chamber 24. However, the bottom of each canister 50 is disposed so that it is exposed to the pressure and fluid flow of the thru-path 22.

Because the canister bottoms are in pressure communication with the fluid flow thru-path 22, each damper canister 50 is disposed to dampen a portion of a pressure change of the fluid in the fluid flow thru-path 22. Additionally, because the canisters are initially gas pressurized from about 2,500 to 5,000 psi, the series of canisters 50 in the housing 12 distribute the risk of a catastrophic failure of the pressure dampening system over the total number of pressure vessels (damper canister). This greatly reduces or eliminates the risk of a catastrophic failure event from the failure of a single pressure vessel.

Union interfaces 30 are designed and used to accomplish unions in the present invention in a number of situations. For example, union interfaces 30 can be used to join an end 14 of a dampener housing 12 to a housing-to-flow line adapter 20 (see FIG. 1A and FIG. 2), or to an end 14 of another dampener housing 12 (see FIG. 1B). A union interface 30 has a flange member 33 connectable to another flange member 33 (e.g., on the housing-to-flow line adapter 20), using flange fasteners 36.

The damper canisters 50 are intended for use in the present pulsation dampener apparatus 10 as a plurality of damper canisters 50 in series. See FIG. 2. It is the series of damper canisters 50 that cumulatively accomplish the dampening of the fluid pressure pulses in a high-pressure fluid flow line 16. That is to say that the amplitude of fluid pressure pulses at the fluid outlet port 17b is lower than at the fluid inlet port 17a. In the embodiments illustrated, the damper canisters 50 in the depicted series are all substantially identical in structure, operational specifications and function. However, they do not have to be, and there are situations in which the series may not consist of a homogeneous set of damper canisters 50. For example, an initial gas charge in some canisters may be lower than for other canisters in the series set, to accomplish a more gradual onset of damping action upon startup and initial fluid charging of the damper apparatus 10. An assembled damper canister 50 is disposed to withstand an operating environment having varying gas and fluid pressures up to 12,500 psi. The major components of the damper canisters 50 are all similar Each damper canister 50 (FIGS. 3A & 3B) has a canister housing 52, a damper piston assembly 70, a piston stop ring 60, and a gas port fitting 90, as illustrated in FIGS. 4 & 5 and FIGS. 6A & 6B.

The canister housing 52 is in the form of a high-pressure gas cylinder, open at one end. The canister housing 52 has a housing interior space 54 and a cross-sectional housing opening 56 at the one open end. The interior wall 58 of the canister housing 52 is adapted to closely receive a piston assembly 70. The piston assembly is slideable along the interior wall 56 from the rim 57 at the housing opening 56 to a depth D of the interior wall 56. Though closely received in the cross-section of the housing opening 56 of the canister housing 52, the damper piston assembly 70 is freely slideable along the depth D of the interior wall 56 in response to a difference in pressure across the piston assembly 70.

A stop ring 60 is fixable to the housing rim 57 at the housing opening 56 of the canister housing 52. The stop ring 60 is fixed to the housing rim 57 with stop ring fastening means 62; which are threaded fasteners in the illustrated embodiment. The piston stop ring 60 is adapted to retain the damper piston assembly 70 slideably within the canister housing 52. The further adaptation of the piston stop ring 60 is not obvious and is important because of the high-pressure and fluid suspension environment in which it operates. To use fracing fluid as a fluid suspension example, fracing fluid is not only abrasive (because it contains sand suspended in the fluid), the solids that form the suspension can and do settle-out on horizontal surfaces, accumulate like plaques, and can hinder/restrict travel of the piston. Therefore, the structural cross-section of the stop ring 60 and the features of its interface with the housing rim 57 and piston skirt 76 are adapted to avoid accumulating sand/suspension plaques. The canister housing 52, damper piston assembly 70 and stop ring 60 in combination are adapted to contain a gas in the housing interior space 54 at continuously varying pressures of up to 12,500 psi, to accomplish the present damper canister 50.

The piston assembly 70 comprises a damper piston 72 having a damper piston head 74 portion and a damper piston skirt 76 portion. The piston head 74 portion has a gas pressure surface 75a and a fluid pressure surface 75b. The piston skirt 76 portion has at least one piston ring channel 79, within each of which a piston ring 82 is received. A first piston ring 82 is a gas/fluid sealing ring. A sealing type piston ring 82 is biased by the ring channel 79 to form a slideable gas/fluid pressure seal between the piston skirt 76 and the interior wall 56 of the canister housing 52. Other rings may also be provided for sealing and/or particle wiping. The for example, in another embodiment (not shown) the piston skirt 76 has two ring channels 79 for mounting a gas/fluid sealing ring, and also a wiper ring between the gas/fluid sealing ring and the frac fluid. The wiper ring is adapted to prevent sand or suspension material from impacting the gas/fluid sealing ring. The piston assembly 70 is slideable within the canister housing 52 in response to a sufficient pressure difference between the gas pressure within the housing interior space 54 of the damper canister 50 and the fluid pressure of the fluid flow thru-path 22 outside of the damper canister 50.

Additionally, the damper piston head 74 portion of the damper piston 72 has a gas port fitting 90. The gas port fitting 90 is adapted to provide a sealable through-port between the gas pressure surface 75a and the fluid pressure surface 75b of the piston head 74. The gas port fitting enables the housing interior space 54 to receive and contain a gas charge to bias the housing interior space 54 at an initial gas pressure. The gas port fitting 90 component of the damper piston 72 has a gas through-port 92 between the gas pressure surface 75a and the fluid pressure surface 75b of the piston head 74. A normally closed gas check valve 94 provides a means to charge the housing interior space 54 with a gas, such as nitrogen, and prevents the gas from escaping. A gas port cover 96 protects the gas valve 94 from the fluid at the fluid pressure surface 75b of the piston head 74, and further seals the gas port fitting to prevent gas from leaking out of the canister housing 52. Although illustrated as a component of the damper piston 72 in FIGS. 4 & 5, the gas port fitting 90 may be disposed elsewhere on a damper canister 50 as selectable by on of skill in the art, see FIGS. 6A & 6B.

Figure 7A:
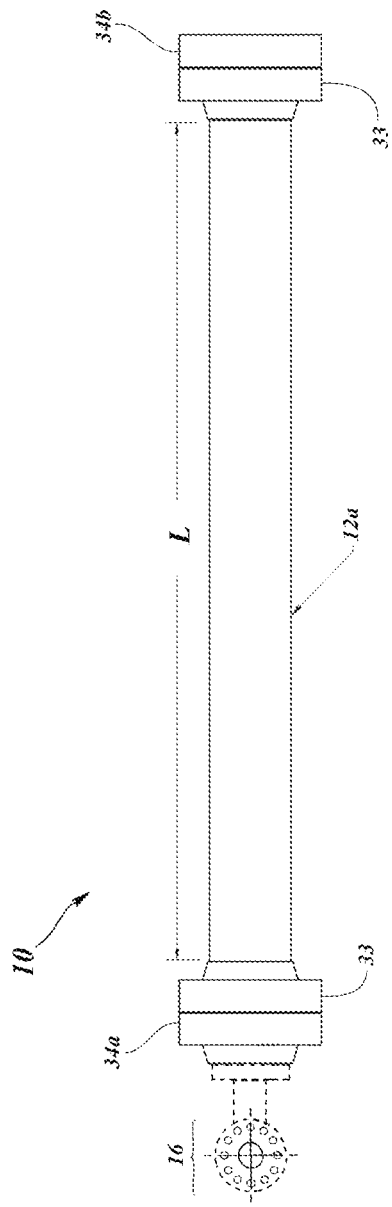
FIG. 7A & FIG. 7B are: (A) a side elevation view, and a perspective view of an alternative embodiment of the present high-pressure flow pulsation dampener apparatus.
Figure 7B:
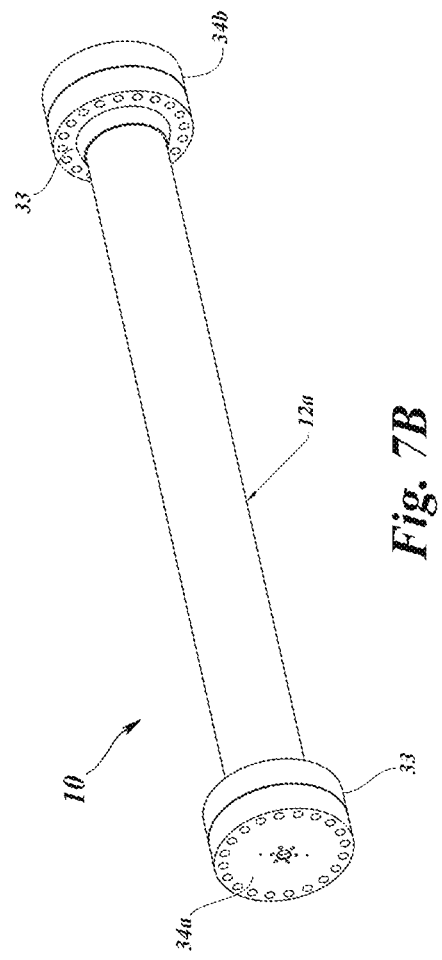
Figure 13A:
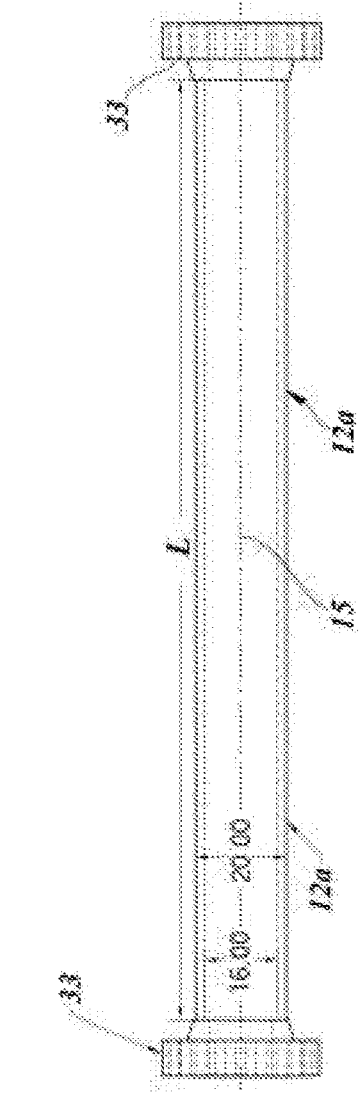
FIGS. 13A-13C are various view of a canister housing for practice with tandem damper canisters in the present apparatus.
Figure 13B:
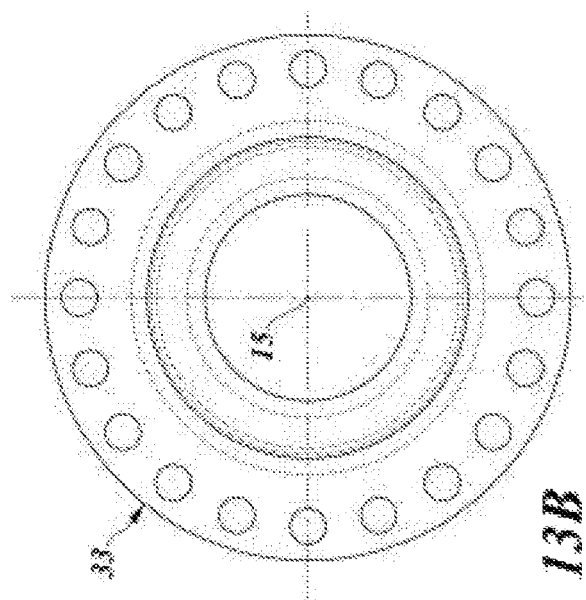
Figure 13C:
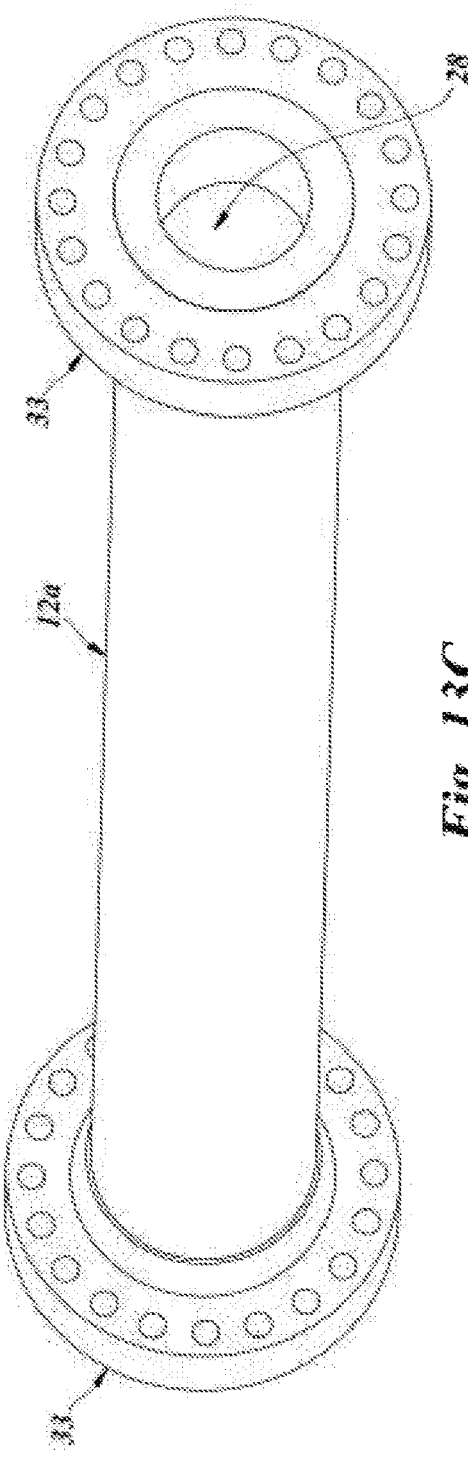

In an alternative embodiment for dampening pressure pulsations in a high-pressure fluid flow line/conduit, the pulsation dampener apparatus 10a of the present invention can be configured as illustrated in FIGS. 7A & 7B. In this embodiment, the dampener housing 12a is also a substantially cylindrical tube having a dampener interior fluid space 28 along an axis 15 of length L of the dampener housing 12a. The dampener housing 12a has a first end 14a open and a second end 14c closed. The first end 14a is shown in fluid communication with the high-pressure fluid flow line 16 via flange members 33 & 34a of a pipe union 30. See FIGS. 14A-14D for an example of a flow-through union flange member 34a. The second end 14c is closed with a flange member 33 and a flange plate 34b. However, if desired the second end 14c of the pulsation dampener apparatus 10a may be connected to the fluid flow line 16 or in series to another pulsation dampener apparatus 10a by replacing the flange plate 34b with an appropriate flange member (e.g., 34a). Also see FIG. 8 and FIGS. 13A-13C.

As exemplified in FIGS. 9A-9D, a dampener housing 12a contains at least one "tandem" damper gas canister 50a. The "tandem" feature of the damper gas canister 50a derives from the gas canister 50a housing two separate damper piston assemblies 70a. The gas canister 50a has a canister axis 53, and one or more tandem damper gas canisters 50a are received within the dampener housing 12a with its canister axis 53 parallel to the housing axis 15. The damper gas canisters 50a are in pressure communication with the interior fluid space 28 of the dampener housing 12a. The canister housing 52a of a tandem damper gas canister 50a is in the form of a high-pressure gas cylinder having a housing interior space 54 and a cross-sectional housing opening 56 at each end, and an interior wall 58. The interior wall 58 is adapted to slideably receive a damper piston assembly 70a along a depth D of the interior wall 58.

A damper piston assembly 70a is closely received within the cross-sectional opening 56 of each end of the canister housing 52a. In the embodiments illustrated, the damper piston assemblies 70a are freely slideable along the depth D of the interior wall 58 of the canister housing 52a. As exemplified in FIGS. 10A-10D, the damper piston 72 of the piston assembly 70a has a piston head 74 portion and a piston skirt 76 portion. The piston head 74 portion of the damper piston 72 has a gas pressure surface 75a and a fluid pressure surface 75b. The piston skirt 76 portion has at least one piston ring channel 79. Piston ring channels each will contain a wiper ring 82. Wiper rings 82 are biased by the ring channel 79 to form a slideable gas/fluid pressure seal between the piston skirt 76 and the interior wall 58 of the canister housing 52a. The piston assembly 70a is slideable in one direction or another within the canister housing 52a in response to a sufficient pressure difference between the gas pressure within the canister interior space 54 and the fluid pressure of the fluid contained within the dampener housing interior fluid space 28 of said pulsation dampener apparatus 10a. That is, when there is a $\Delta_{Press}$ across the gas pressure surface 75a and the fluid pressure surface 75b of the piston head 74. The structure of the piston head 74 provides a pressure differential energized seal system substantially similar to that described for the piston head 74 of FIG. 5. Wherein, the deformation of the piston head 74 from the pressure differential across the piston head surfaces 75a & 75b causes the dome of the piston head 74 to flatten, thus further biasing the seal portion of the piston assembly radially and toward the canister wall 58, effecting an improved seal.

As illustrated in the figures, this embodiment of the damper piston head 74 portion of the damper piston 72 has a gas port fitting 90. Although illustrated as a component of the damper piston 72 in FIGS. 4 & 5, the gas port fitting 90 may be disposed elsewhere on a damper canister 50 as selectable by on of skill in the art, see FIGS. 6A & 6B. The gas port fitting 90 is adapted to provide a sealable through-port between the gas pressure surface 75a and the fluid pressure surface 75b of the piston head 74. The gas port fitting 90 is provided to enable the canister interior space 54 to receive and contain a gas charge to bias the canister interior space 54 at an initial gas pressure, e.g., at 4,000 psi. In the embodiment exemplified in FIGS. 10A-10D, the gas port fitting 90 is substantially the same as that depicted in FIG. 5.

Figure 4:
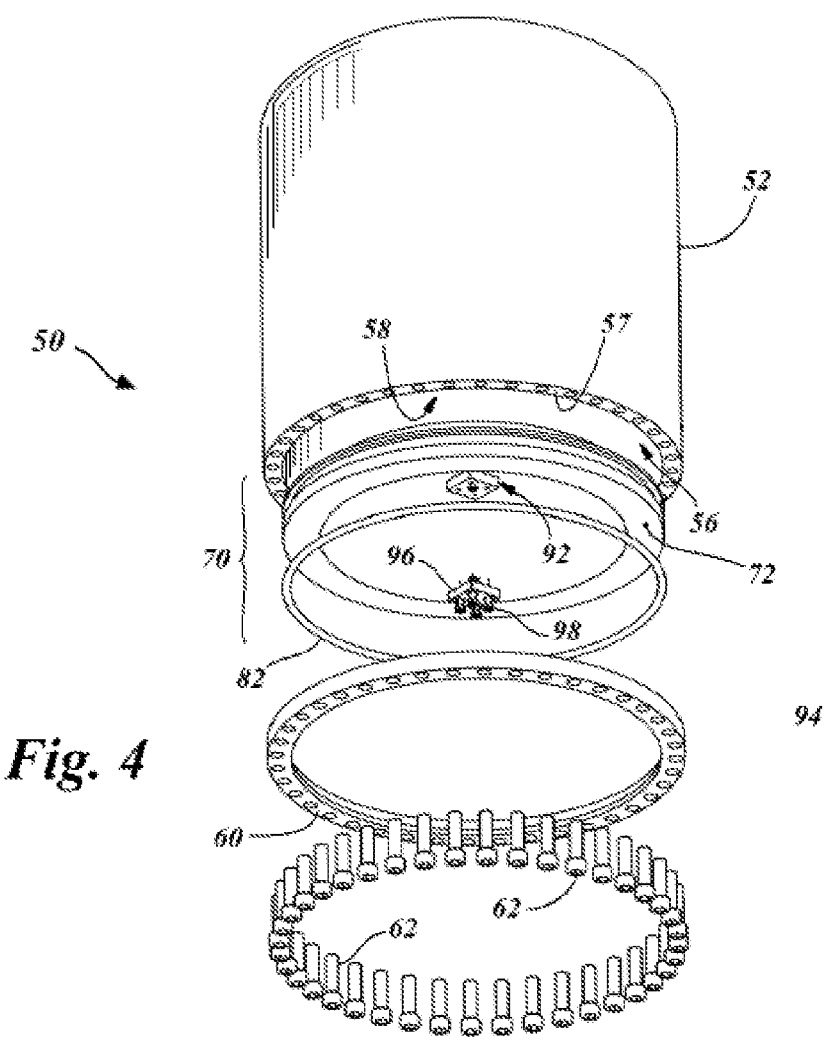
FIG. 4 is an exploded perspective view of components of a damper canister of the present high-pressure flow pulsation dampener.
Figure 5:
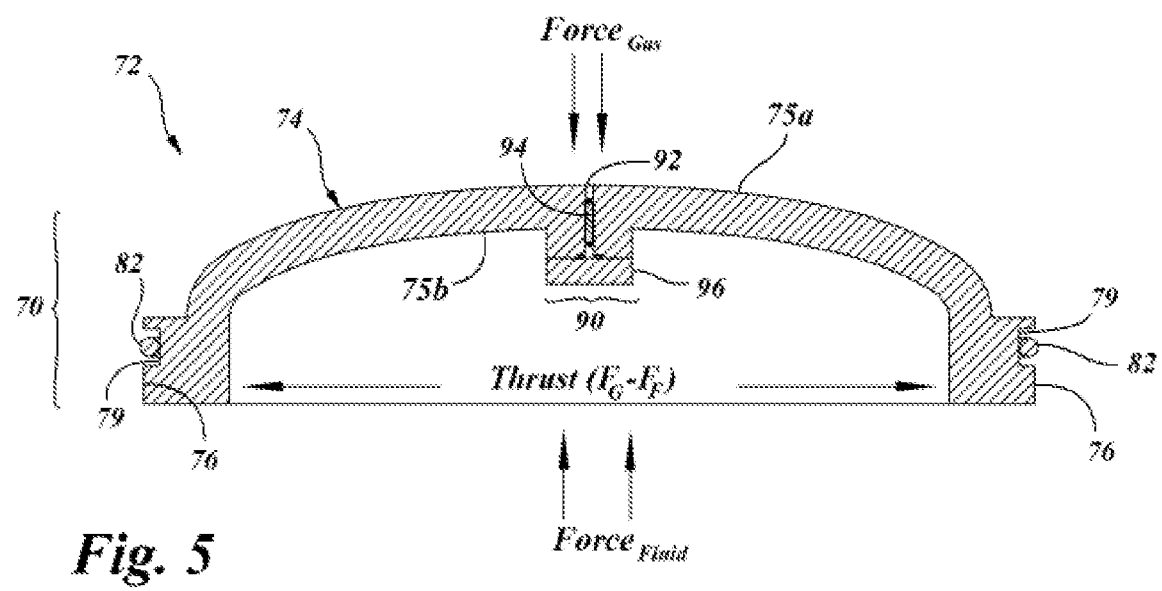
FIG. 5 is a side elevation cross-sectional schematic view of the piston assembly of the present high-pressure flow pulsation dampener.

As shown in FIGS. 11A-11D, a stop ring 60 is fixable to the housing rim 57 at each housing opening 56, using such means as exemplified in FIG. 4, or by other means as selected by the skilled artisan and adapted to retain the damper piston assembly 70a slideably within the canister housing 50. The canister housing 52a, damper piston assembly 70a and stop ring 60 in combination are adapted to contain a gas in the housing interior space 54 at continuously varying pressures up to 12,000 psi to provide the present damper canister 50a.

Figure 15:
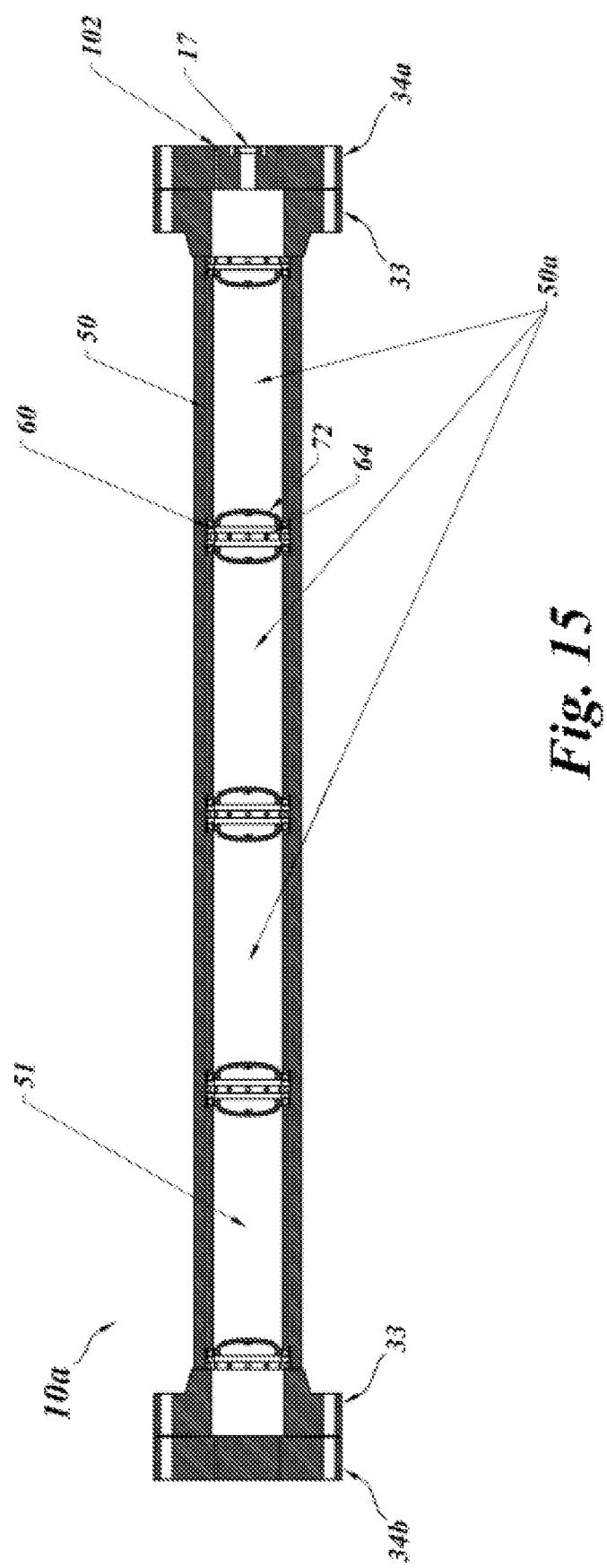
FIG. 15 is a cross-sectional view through a side elevation of a tandem damper canister HP flow pulsation dampener apparatus of FIG. 7.

As illustrated in FIG. 15, the present pressure pulsation dampener apparatus 10a is adapted to receive a plurality of tandem damper gas canisters 50a in series within the dampener housing 12a. In this embodiment, all of the tandem canister axes 53 are parallel (and coaxial) to the dampener housing axis 15. A through-flow spacer ring 64 (see FIGS. 12A-12D) is disposed between adjacent tandem damper gas canisters 50a. The through-flow spacer rings 64 enable fluid (from the high-pressure fluid flow line 16) to be communicated throughout the housing fluid space 28 of the dampener housing 12a, and thence to the piston fluid pressure surfaces 75b of the piston heads 74 between adjacent tandem damper gas canisters 50a.

In another alternative embodiment exemplified in FIGS. 16A & 16B, the present pressure pulsation dampener apparatus 10a may be configured as a series of single canister dampener housings 12c disposed in a high-pressure fluid flow line 16 to accomplish the present invention (see 10c in FIG. 16B).

Attached as an Appendix is an engineering & design report exemplifying materials and design considerations for various embodiments of the present invention. The report is included herein by reference.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A pressure pulsation dampener apparatus for use in a HP fluid flow line, the apparatus comprising:

a dampener housing (12a) substantially being a cylindrical tube having a dampener interior fluid space (28) along a dampener housing axis (15) of length (L), a first open end (14a) is in fluid communication with said HP fluid flow line (16) via a union (30) and said HP fluid flow line (16) communicating fluid pressures of greater than 5,000 psi, and a second closed end (14c); and at least one tandem damper gas canister (50a) having a canister axis (53), the tandem damper gas canister (50a) received within the dampener housing (12a) with its canister axis (53) parallel to the housing axis (15), the damper gas canister (50a) in pressure communication with the interior fluid space (28) of the dampener housing (12a), with the at least one tandem damper canister (50a) having two damper piston assemblies (70a) received in the damper canister (50a).

2. The apparatus of claim 1, wherein the tandem damper gas canister (50a) comprises:

a canister housing (52a) in the form of a high-pressure gas cylinder, the canister housing (52a) having a housing interior space (54) and a cross-sectional housing opening (56) at each end, and an interior wall (58) adapted to slideably receive a piston assembly (70a) along a depth (D) of the interior wall (58);

a damper piston assembly (70a) is closely received in the cross-sectional opening (56) at each end of the canister housing (52a), the damper piston assemblies (70a) are freely slideable along the depth (D) of the interior wall (56) of the canister housing (52a);

a stop ring (60) is fixable to a housing rim (57) at each housing opening (56) with stop ring fastening means (62) and adapted to retain the damper piston assembly (70a) slideably within the canister housing (50); and the canister housing (52a), damper piston assembly (70a) and stop ring (60) in combination adapted to contain a gas in the housing interior space (54) at continuously varying pressures up to 12,000 psi to provide said damper canister (50a).

3. The tandem damper gas canister (50a) of claim 2, wherein the piston assembly (70a) comprises:

a damper piston (72) having a damper piston head (74) portion and a damper piston skirt (76) portion;
the piston head (74) portion having gas pressure surface (75a) and a fluid pressure surface (75b);
the piston skirt (76) portion, having at least one piston ring channel (79) within each of which ring channels (79) a wiper ring (82) is received;
the wiper ring (82) being biased by the ring channel (79) to form a slideable gas/fluid pressure seal between the piston skirt (76) and the interior wall (58) of the canister housing (52a); and
the piston assembly (70a) being slideable within the canister housing (52a) in response to a sufficient pressure difference between a gas pressure within the canister interior space (54) and a fluid pressure of a fluid contained within the dampener housing interior fluid space (28) of said pulsation dampener apparatus (10a).

4. The damper canister (50a) of claim 2, wherein the piston assembly (70a) further comprises the damper piston head (74) portion of the damper piston (72) having a gas port fitting (90) adapted to provide a sealable through-port between the gas pressure surface (75a) and the fluid pressure surface (75b) of the piston head (74) to enable the canister interior space (54) to receive and contain a gas charge to bias the canister interior space (54) at an initial gas pressure.

5. The piston assembly (70a) of claim 4 wherein gas port fitting (90) of the damper piston (72) comprises:

a gas through-port (92) between the gas pressure surface (75a) and the fluid pressure surface (75b) of the piston head (74);
a normally closed gas valve (94) providing a means to charge the housing interior space (54) with a gas; and
a gas port cover protecting the gas valve (94) from a fluid at the fluid pressure surface (75b) of the piston head (74).

6. The piston assembly (70a) of claim 4, wherein a structure of the piston (72) provides a pressure differential energized seal system designed to maintain a constant clearance between the piston assembly (70) and the canister wall, with the deformation of the piston head (74) from the pressure differential across the piston head surfaces (75a & 75b) causes the piston head (74) to flatten, thus further biasing the seal portion of the piston assembly radially and toward the canister wall, effecting an improved seal.

7. The pressure pulsation dampener apparatus of claim 1, wherein the dampener housing (12a) is adapted to receive a plurality of tandem damper gas canisters (50a) within the dampener housing (12a) with all of the canister axes (53) parallel and coaxial to the dampener housing axis (15), and further having a through-flow spacer ring (64) disposed between adjacent tandem damper gas canisters (50a) for communicating a fluid pressure of the dampener housing interior fluid space (28) of the dampener housing (12a) to a piston fluid pressure surface (75b) of a piston head (74) between adjacent tandem damper gas canisters (50a).

* * * * *